A. J. AND J. R. MIZE AND J. W. IVERS.
AUTOMOBILE TILTING FRAME.
APPLICATION FILED DEC. 27, 1920.
1,399,641.
Patented Dec. 6, 1921.
3 SHEETS—SHEET 2.
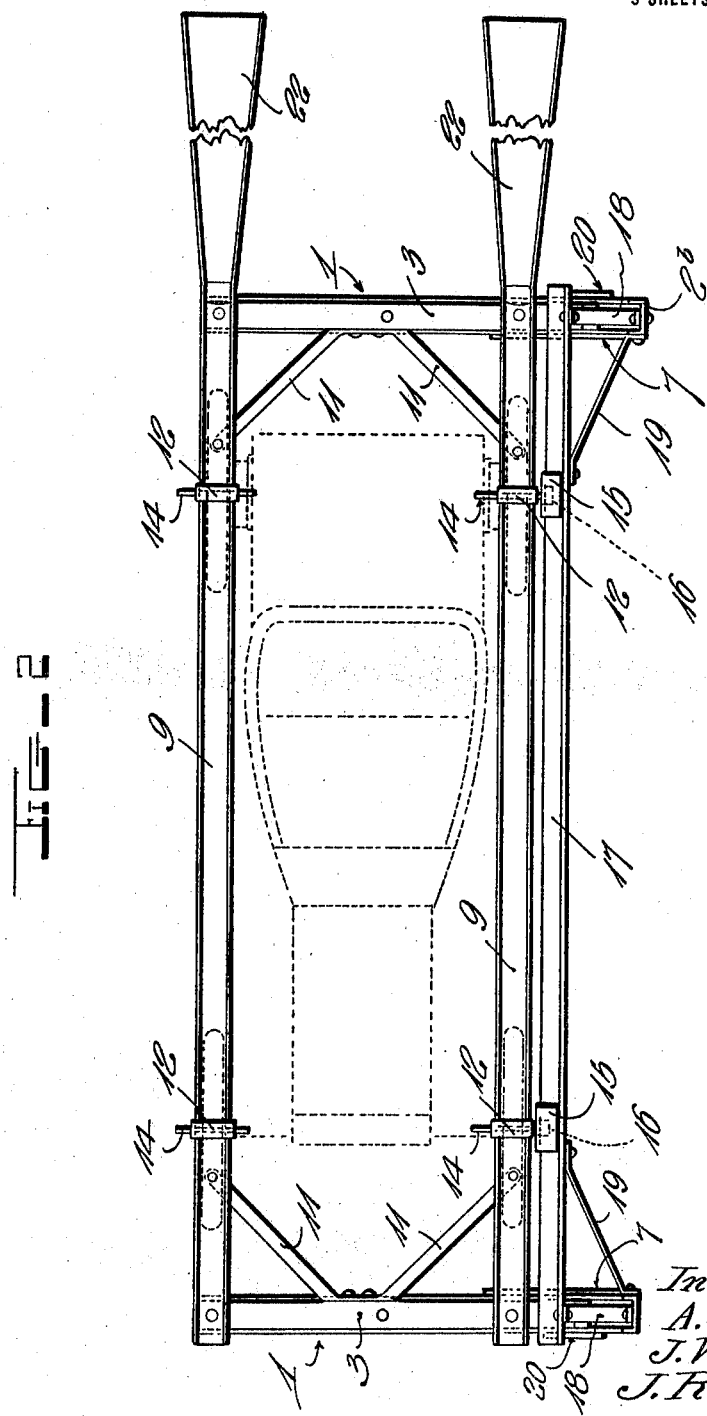
Inventors
A. J. Mize
J. W. Ivers
J. R. Mize
By H. B. Willson & Co.
Attorneys

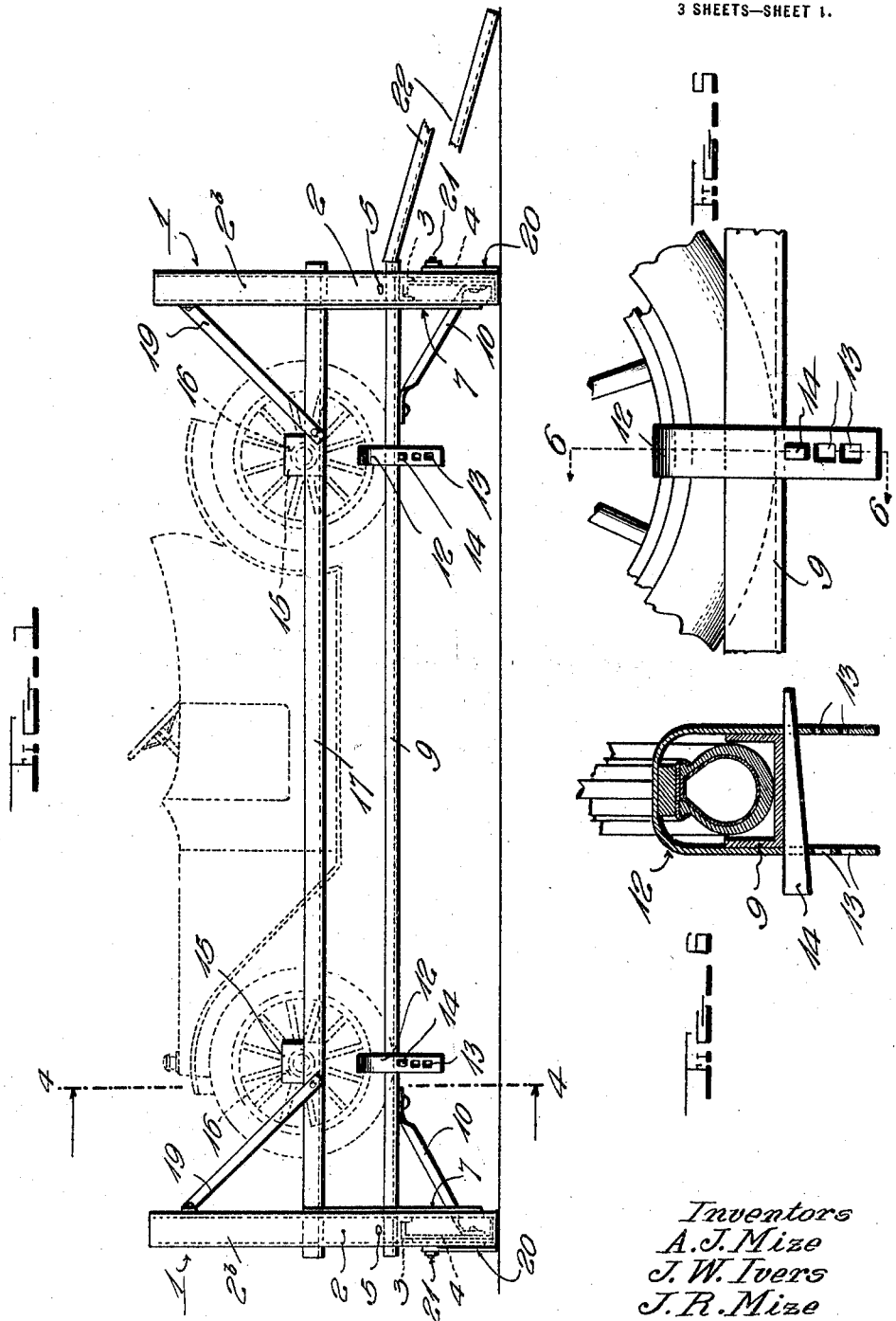

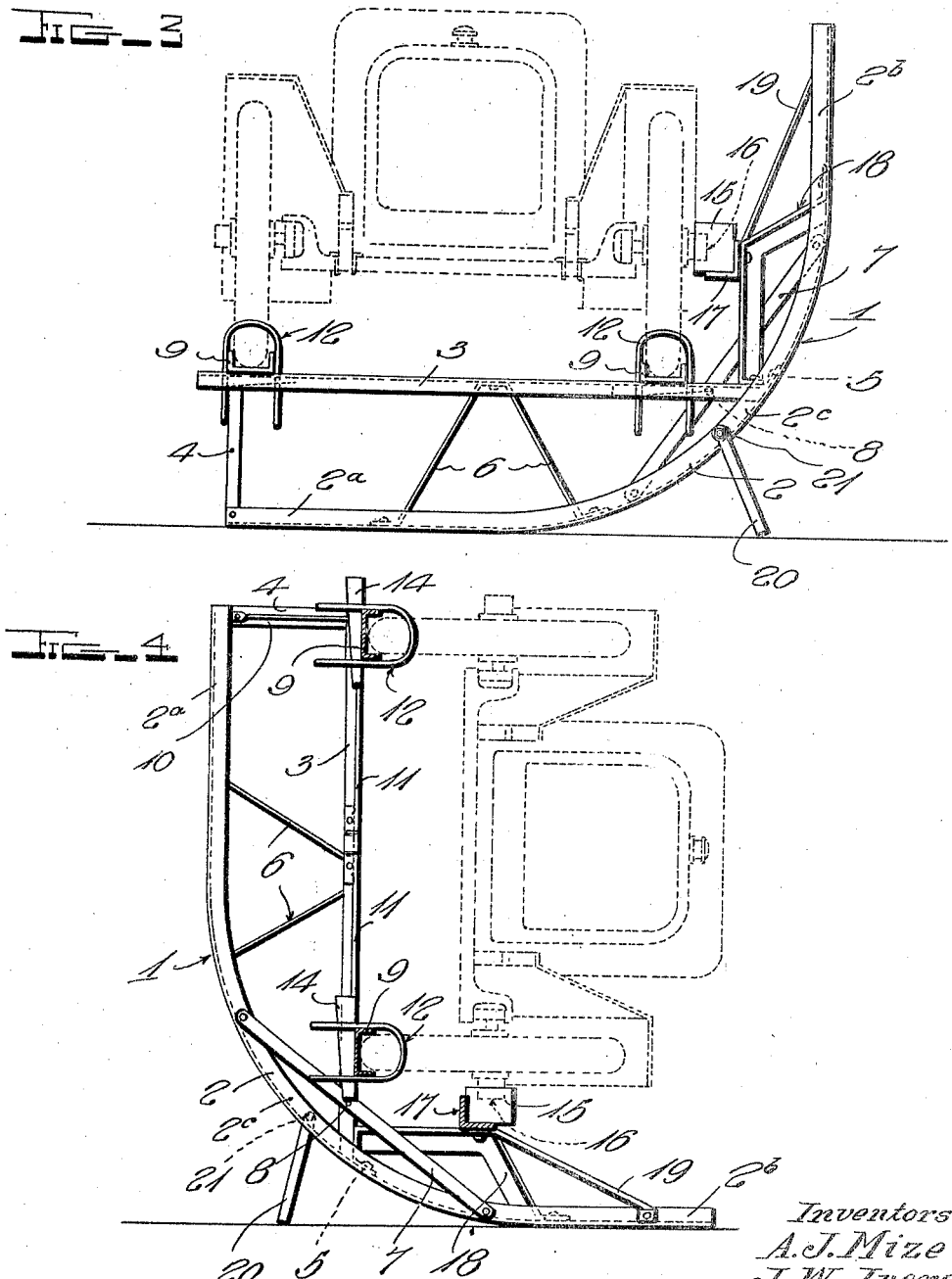

UNITED STATES PATENT OFFICE.

ALLEN J. MIZE, JAMES R. MIZE, AND JOHN W. IVERS, OF OKLAHOMA, OKLAHOMA.

AUTOMOBILE-TILTING FRAME.

1,399,641.   Specification of Letters Patent.   Patented Dec. 6, 1921.

Application filed December 27, 1920. Serial No. 433,266.

*To all whom it may concern:*

Be it known that we, ALLEN J. MIZE, JAMES R. MIZE, and JOHN W. IVERS, citizens of the United States, residing at Oklahoma, in the county of Oklahoma and State of Oklahoma, have invented certain new and useful Improvements in Automobile-Tilting Frames; and we do declare the following to be a full, clear, and exact description of the invention, such as will enable others skilled in the art to which it appertains to make and use the same.

Our invention relates to improvements in frames which are used for tilting automobiles in such a manner as to expose the under side thereof, for painting or repairing, and the principal object of the invention is to provide a frame of this character which may be rather easily and inexpensively manufactured and marketed, yet one which will be highly efficient and desirable, and may be readily tilted without the use of any power operated means.

With the foregoing in view, the invention resides in the novel construction and arrangement of parts hereinafter described and claimed, the descriptive matter being supplemented by the accompanying drawing.

Figure 1 is a side elevation of a tilting frame constructed in accordance with our invention, showing an automobile supported thereby, this automobile being illustrated in dotted lines.

Fig. 2 is a top plan view.

Fig. 3 is an end elevation.

Fig. 4 is a vertical transverse sectional view as indicated by line 4—4 of Fig. 1.

Fig. 5 is a detail elevation showing more particularly the clamp construction.

Fig. 6 is a detail sectional view as indicated by line 6—6 of Fig. 5.

In the construction of our invention, we employ a pair of similarly constructed end frames 1, each of which includes a rocker 2 having a straight horizontal end $2^a$, a straight vertical end $2^b$, and a curved connecting portion $2^c$. Spaced above the end portion $2^a$ of each frame rocker, is a transverse horizontal bar 3 whose outer end is supported from said end $2^a$ by means of a suitable leg 4, while its inner end is suitably secured at 5 to the curved portion $2^c$ of the rocker. An inverted V-shaped brace 6 preferably extends between the bar 3 and the rocker as shown clearly in Figs. 3 and 4, and another brace bar 7 by preference extends across the curved portion 2 of the track, being suitably secured at its ends to said track, while its intermediate portion is preferably connected at 8 with the bar 3.

A pair of longitudinal tracks 9 are secured near their ends to the horizontal bars 3 and are braced to the end frames 1 by means of inclined braces 10 and oblique horizontal braces 11, said tracks, as well as the rockers 2 being preferably formed of channel iron as shown, while the several braces may well be constructed of strap iron.

The tracks 9 are adapted to receive the wheels of an automobile as shown clearly in Figs. 1 and 4, and in order to secure said wheels on the tracks, we use four arched metal bars 12 which straddle the fellies, rims, and tires of the wheels as well as the aforesaid tracks, the vertical legs of said arched bars being of a length to extend below the tracks and having a plurality of vertically spaced openings 13 to receive wedges 14 which are adapted to contact with the lower sides of the tracks. It will be seen that by driving these wedges in place, the wheels of the machine will be tightly held on the tracks 9.

In connection with the wheel securing means above described, we employ a novel arrangement of parts for supporting the principal weight of the automobile from the hub plates when it is tilted on one side as indicated in Fig. 4. For this purpose, we use a pair of blocks 15 which are preferably although not necessarily formed of wood, said blocks having sockets 16 in their inner ends to receive the hubs of the automobile wheels, permitting the hub plates to bear against the blocks as indicated in Fig. 4. The blocks are preferably rectangular and one outer corner thereof is seated removably in the angle of a longitudinal angle iron bar 17 which extends between the two end frames 1 on a line spaced above and laterally from one of the tracks 9. The ends of the bars 17 are preferably secured to a pair of angle iron brace bars 18 which are suitably secured at their upper ends to the rockers 2 and at their lower ends to the bars 3 and the braces 7. Inclined braces 19 preferably extend from the upper ends of the aforesaid rockers to the longitudinal bars 17.

A pair of suitable legs 20 are pivoted at 21 to the curved portions $2^c$ of the rockers 2 and these legs serve to hold the entire frame structure either in the horizontal position depicted in Fig. 3, or in the tilted position shown in Fig. 4. When the frame is held horizontally to receive the car thereon, a pair of appropriate approaches 22 decline from the ends of the tracks 9 to the floor so that the machine may be easily driven or rolled onto said tracks. The clamps 12—14, are then applied to tightly clamp the wheels of the machine to the tracks after first placing the blocks 15 over the hubs of the wheels and seating said blocks in the angle of the bar 17. The machine is thus rigidly held on the frame and by swinging the legs 20 to an out-of-the-way position, the frame and machine may be tilted by hand so as to expose the lower side of the latter, for the purpose of cleaning, painting or repairing. When the frame is tilted, the legs 20 may be again swung to an operative position to hold the same against return movement, but attention may here be directed to the fact that said frame is substantially balanced in all positions so that it has no great tendency to tilt in either direction. It is thus comparatively easy to tilt the machine by hand, and little strain is put on the legs 20 to hold the device in either position.

From the foregoing, taken in connection with the accompanying drawings, it will be seen that although our invention is of comparatively simple and inexpensive nature, it will be highly efficient and in every way desirable, and since probably the best results may be obtained from the details shown and described, such details may be followed if desired. We wish it understood however that within the scope of the invention as claimed, numerous changes may be made.

What is claimed is:

1. An automobile tilting frame comprising a pair of end frames each including a rocker, a pair of wheel supporting tracks extending between said end frames, means for clamping the automobile wheels to said tracks, a pair of hub engaging blocks, and an angle metal bar extending between the two end frames and spaced upwardly and laterally from one of said tracks to receive said blocks in its angle.

2. An automobile tilting device comprising a pair of end frames, each frame including a rocker having a horizontal end portion, a vertical end portion, and a curved connecting portion, each of said end frames also including a horizontal bar spaced upwardly from the horizontal end of the rocker, and means connecting said bar and rocker, a pair of longitudinal wheel supporting tracks secured to said horizontal bars and extending between the two end frames, means for clamping the wheels of an automobile on said tracks, a pair of blocks having sockets in one end to receive the hubs of two of the automobile wheels, an angle metal bar spaced upwardly and laterally from one of the aforesaid tracks and adapted to receive said blocks in its angle, and a pair of angular brace bars secured to said end frames and carrying said angle metal bar.

3. A device of the class described including a channel iron wheel supporting track, an arched bar adapted to straddle the felly, rim and tire of a wheel resting on said track, the vertical legs of said arched bar being adapted to extend below said track and having openings, and a wedge insertible through said openings and adapted to contact with the lower side of said track, whereby to tightly clamp the wheel on the track.

4. An automobile tilting frame comprising a pair of spaced end frames, each consisting of a rocker having a horizontal end, a vertical end, and a curved connecting portion, a horizontal bar above the horizontal end of the rocker, a leg supporting the outer end of said horizontal bar from said horizontal end of said rocker, the other end of said horizontal bar being secured to the curved connecting portion of said rocker, and a diagonal brace extending across the curve of the rocker and secured at its ends to said rocker, the intermediate portion of said brace being secured to said horizontal bar; a pair of channel iron tracks extending between the two end frames and secured to said horizontal bars, means for clamping automobile wheels on said tracks, hub engaging blocks, a longitudinal bar braced to the vertical ends of said rockers and adapted to be engaged by said blocks, and brace bars secured at their ends to said end frames, said brace bars carrying said longitudinal bar.

In testimony whereof we have hereunto set our hands.

ALLEN J. MIZE.
JAMES R. MIZE.
JOHN W. IVERS.